United States Patent
Tripathi et al.

(10) Patent No.: US 10,990,555 B1
(45) Date of Patent: Apr. 27, 2021

(54) PROGRAMMABLE PIPELINE AT INTERFACE OF HARDENED BLOCKS

(71) Applicant: XILINX, INC., San Jose, CA (US)

(72) Inventors: Aashish Tripathi, Hyderabad (IN); Sundeep Ram Gopal Agarwal, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/735,358

(22) Filed: Jan. 6, 2020

(51) Int. Cl.
*G06F 13/40* (2006.01)
*G06F 13/20* (2006.01)

(52) U.S. Cl.
CPC .......... *G06F 13/4027* (2013.01); *G06F 13/20* (2013.01)

(58) Field of Classification Search
CPC ............................. G06F 13/4027; G06F 13/20
USPC ........................................................ 710/306
See application file for complete search history.

(56) References Cited

U.S. PATENT DOCUMENTS

| | | | | |
|---|---|---|---|---|
| 4,677,499 A * | 6/1987 | Shirota | ................... | G11B 20/18 327/152 |
| 4,963,768 A * | 10/1990 | Agrawal | .......... | H03K 19/17708 326/38 |
| 5,247,195 A * | 9/1993 | Turner | ............. | H03K 19/17712 257/203 |
| 5,490,113 A * | 2/1996 | Tatosian | ................ | G11C 7/1051 365/189.05 |
| 5,680,633 A * | 10/1997 | Koenck | ................ | H04B 1/3833 235/472.02 |
| 6,044,429 A * | 3/2000 | Ryan | ...................... | G06F 13/161 710/240 |
| 6,122,762 A * | 9/2000 | Kim | ........................ | G11C 29/32 714/726 |
| 6,145,069 A * | 11/2000 | Dye | ........................ | H03M 7/30 345/501 |
| 6,314,539 B1 * | 11/2001 | Jacobson | ....... | G01R 31/318541 714/727 |
| 6,747,480 B1 * | 6/2004 | Kaptanoglu | ....... | H03K 19/1737 326/41 |
| 6,897,679 B2 * | 5/2005 | Cliff | ........................ | G11C 8/12 326/38 |
| 7,600,143 B1 * | 10/2009 | Neuman | ................... | G06F 7/06 713/500 |
| 7,683,660 B1 * | 3/2010 | Bakker | .............. | H03K 19/1733 326/38 |
| 9,893,727 B1 * | 2/2018 | Atsatt | .............. | H03K 19/17748 |
| 2005/0058187 A1 | 3/2005 | Groen et al. | | |
| 2005/0058290 A1 | 3/2005 | Kryzak et al. | | |
| 2006/0242611 A1 * | 10/2006 | Drake | ................. | G06F 15/7867 326/38 |

(Continued)

*Primary Examiner* — Paul R. Myers
(74) *Attorney, Agent, or Firm* — Patterson + Sheridan, LLP (57) ABSTRACT

Embodiments herein describe an interface between PL fabric and a hardened block that includes a programmable pipeline. This pipeline includes at least a sequential element and a bypass path. For time critical nets in a netlist, the programmable IC routes a net through the sequential element. Doing so mitigates or eliminates the uncertainty associated with routing the net from the hardened block through PL fabric. Also, the sequential element can increase the available time for capturing the data. For less time critical nets, the net can route through the bypass path. This means the route from the hardened block to the PL fabric is determined on the fly by a routing algorithm rather than being fixed.

20 Claims, 6 Drawing Sheets

(56) References Cited

U.S. PATENT DOCUMENTS

| | | | |
|---|---|---|---|
| 2014/0082421 A1* | 3/2014 | Marinissen | G01R 31/318575 714/34 |
| 2014/0156891 A1* | 6/2014 | Alfieri | G06F 13/362 710/110 |
| 2018/0003770 A1* | 1/2018 | Nir | H03K 19/003 |
| 2019/0128963 A1* | 5/2019 | Wu | G01R 31/318536 |
| 2019/0181863 A1* | 6/2019 | Ganusov | H03K 19/00323 |

* cited by examiner

PROGRAMMABLE PIPELINE AT INTERFACE OF HARDENED BLOCKS

TECHNICAL FIELD

Examples of the present disclosure generally relate to transmitting data between programmable logic (PL) and a hardened block in a programmable integrated circuit (IC).

BACKGROUND

Programmable ICs are becoming more diverse and include specialized hardened blocks for performing special functions (e.g., arithmetic operations, media access operations, and the like). For example, field programmable gate arrays (FPGAs) primarily contained a PL fabric with a plurality of configurable logic blocks (CLB) containing PL. Now, FPGAs and programmable ICs such as systems on a chip (SoCs) include more hardened blocks for performing these specialized functions.

Transmitting data between the PL fabric and the hardened blocks is a complicated task. The PL fabric typically includes interface circuitry disposed between the CLBs and a hardened block. The clock speeds used in the programmable ICs are increasing to improve performance but it is becoming increasing difficult to transmit data between the hardened blocks and the PL fabric while meeting timing demands.

SUMMARY

Techniques for operating a programmable integrated circuit are described. One example is a hardened block comprising a first sequential element and a programmable logic (PL) fabric comprising an interface and a second sequential element where the interface comprises a programmable pipeline that communicatively couples the first and second sequential elements. The programmable pipeline comprises a third sequential element and a bypass path that bypasses the third sequential element where the programmable pipeline is programmed to use one of the third sequential element and the bypass path when transmitting data between the first and second sequential elements.

Embodiments herein describe a method that includes determining that a first net in a netlist is time critical, wherein the first net extends from a first sequential element in a hardened block to a second sequential element in a PL fabric, configuring a first programmable pipeline in the PL fabric such that the first sequential element transmits data to a third sequential element in the first programmable pipeline before the data reaches the second sequential element, determining that a second net in the netlist is not time critical where the second net extends from a fourth sequential element in the hardened block to a fifth sequential element in the PL fabric, and configuring a second programmable pipeline in the PL fabric such that a bypass path is used to bypass a sixth sequential element in the second programmable pipeline when transmitting data between the fourth and fifth sequential elements.

Embodiments herein describe a method that includes identifying a first net in a netlist that extends from a first sequential element in a hardened block to a second sequential element in a PL fabric, selecting, based on a time parameter of the first net, one of (i) using a third sequential element in a programmable pipeline in the PL fabric and (ii) using a bypass path in the programmable pipeline that bypasses the third sequential element when transmitting data between the first and second sequential elements, and configuring the programmable pipeline in response to the selecting.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the various features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe an interface between PL fabric and a hardened block that includes a programmable pipeline. This pipeline includes a sequential element and a bypass path. For a time critical net in a netlist, the programmable IC routes the net through the sequential element. Doing so mitigates or eliminates the uncertainty associated with routing the net from the hardened block through PL fabric. Also, the sequential element can increase the available time for capturing the data. For a less time critical net, the net can use a route that includes a sequential element in the PL fabric (rather than the sequential element in the programmable pipeline). In that case, the route from the hardened block to the PL fabric is determined on the fly by a routing algorithm rather than being fixed. While the embodiments herein describe using the programmable pipeline when communicating between PL fabric and a hardened block, the programmable pipeline may be useful when establishing communication between other types of blocks in a SoC (whether a hardened block, soft block, configurable logic block, memory, data processing engine, and the like) or between blocks in different SoCs.

In one embodiment, the sequential element in the pipeline can be dual purposed. That is, rather than the interface containing programmable pipelines with sequential elements dedicated to transmitting data from the PL fabric to the hardened block, or dedicated to transmitting data from the hardened block to the PL fabric, additional routing circuitry (e.g., multiplexers) can be added to the programmable pipelines so that the sequential elements can be used to transmit data in either direction. This may mean the overall number of sequentially elements in the interface can be reduced relative to an interface that contains dedicated sequential elements.

Figure 1:
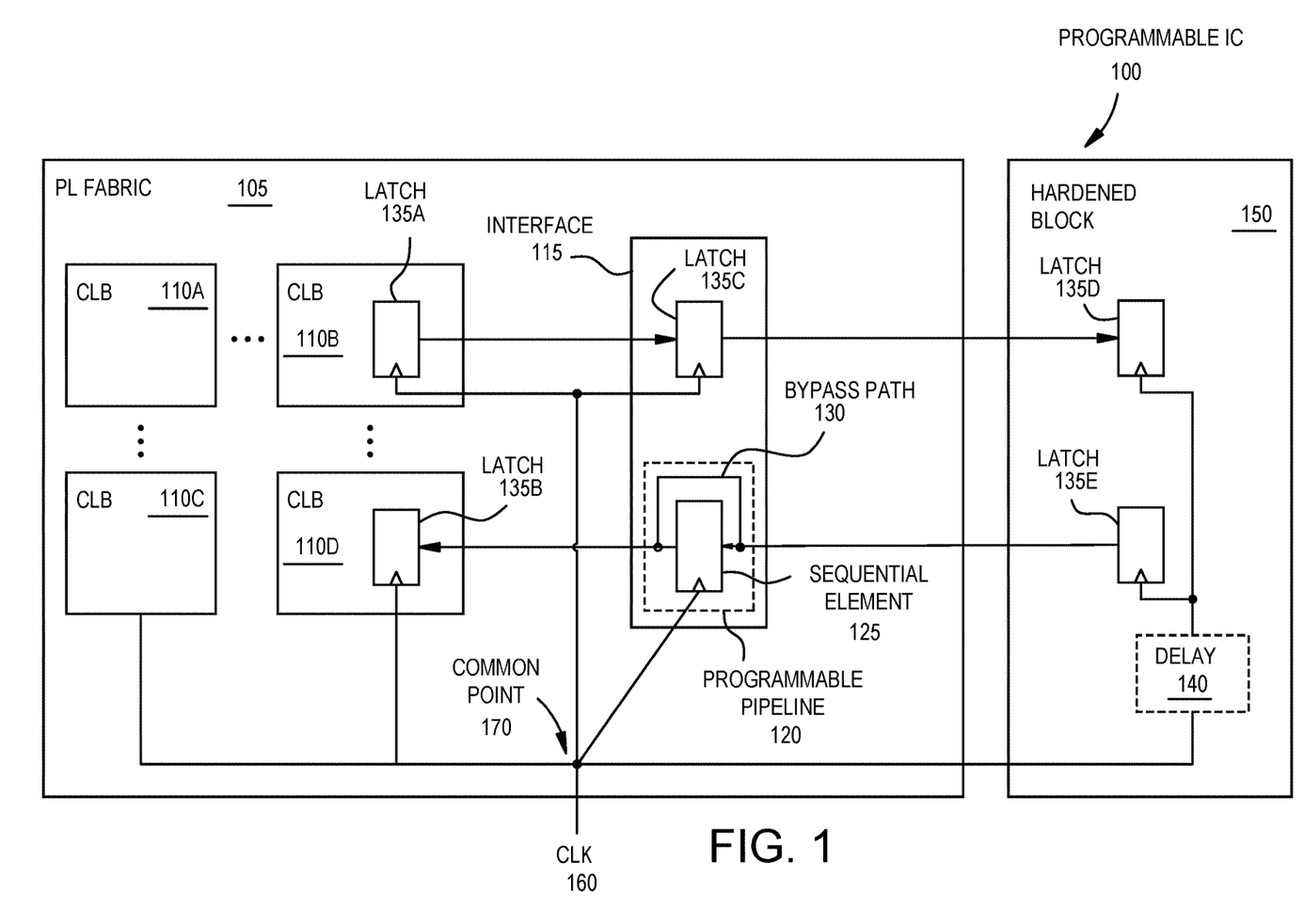
FIG. 1 is a block diagram of a programmable IC, according to an example.

FIG. 1 is a block diagram of a programmable IC 100, according to an example. The programmable IC 100 (e.g., an FPGA or SoC) contains a PL fabric 105 and a hardened block 150. The PL fabric 105 and the hardened block 150 share a same clock (CLK) 160. As shown, the CLK 160 is routed through a common point 170 where the CLK 160 extends into the PL fabric 105 and the hardened block 150. However, in this example, the hardened block 150 has a higher clock insertion delay than the PL fabric 105. This insertion delay is illustrated by a delay 140 shown in ghosted lines in the hardened block 150. The delay 140 results in a clock skew between the CLK 160 in the PL fabric 105 and the CLK 160 in the hardened block 150. This clock skew makes meeting the timing requirements when transmitting data between the PL fabric 105 and the hardened block 150 challenging.

On one hand, the delay 140 makes it more difficult to satisfy the timing requirements when transferring data from the hardened block 150 to the PL fabric 105. On the other hand, the clock skew due to the delay 140 can make meeting timing requirements when transmitting data from the PL fabric 105 to the hardened block 150 easier. That is, the clock skew actually relaxes the timing requirements when transmitting data from the PL fabric 105 to the hardened block 150. In some cases, however, the data path delay becomes more than clock insertion delay within the hardened blocks 150 making the timing closure difficult. This may require using a sequential element (e.g., a pipeline element) for the signals going from the PL fabric 105 to hardened block 150. As discussed below, the decision to either use a sequential element in the PL fabric 105 or the sequential element 125 in the programmable pipeline 120 is based on timing requirements.

Another issue with transmitting data between the PL fabric 105 and the hardened block 150 is the routes chosen by a routing algorithm when configuring the PL fabric 105 and different placements of various pipeline flops (belonging to a bus). Although a simple bus is shown (e.g., a route from the PL fabric 105 to the hardened block 150 and another route from the hardened block to the PL fabric 105), in a practical implementation, the bus may be much wider (e.g., a 256 bit bus for transferring data). Each of these bits is assigned a net in a netlist when selecting a routing path between the PL fabric 105 and the hardened block 150. Identifying sufficient routing resources in the PL fabric 105 for that many nets is difficult. In some cases, the routing algorithm may route a net along a circuitous path between the hardened block 150 and its destination in the PL fabric 105 (e.g., one of the CLBs 110). This circuitous route adds additional latency to the signal which, for timing critical nets, may result in the nets not satisfying their timing requirements.

To solve or mitigate these issues, the PL fabric 105 includes a programmable pipeline 120 in an interface 115 between the CLBs 110 in the PL fabric 105 and the hardened block 150. The programmable pipeline 120 solves (or at least mitigates) the first issue by improving the timing closure challenge caused by the insertion delay (e.g., the delay 140) and the skew in the CLK 160. The programmable pipeline 120 includes a sequential element 125 (e.g., a flip-flop, latch, or register) which receives the data from the hardened block 150. That is, rather than the hardened block 150 transferring data directly to a latch 135B in the CLB 110D, the hardened block 150 first transfers the data into the sequential element 125. Using the sequential element 125 means the data-path delay would be shorter due to a dedicated small route delay through the interface 115. Doing so increases the amount of available time for the first stage of a latch, which compensates for the delay 140 and the skew in the CLK 160. While FIG. 1 illustrates the interface 115 as being disposed in the PL fabric 105, the interface 115 may instead be disposed within the hardened block or may be separate from both the PL fabric 105 and the hardened block 150.

Moreover, routing data through the sequential element 125 has the additional benefit of removing the uncertainty and variation when routing a net from the hardened block 150 to one of the CLBs 110. Put differently, rather than a routing algorithm attempting to route nets directly from the hardened block 150 to latches 135 in the CLBs, using the sequential element 125 fixes (or sets) the route between the hardened block 150 and the PL fabric 105. Put differently, using the sequential element 125 takes the task of routing the nets from the hardened block 150 to the interface 115 of the PL fabric 105 away from the routing algorithm. The nets are instead assigned a dedicated route from the hardened block 150 into the PL fabric 105—i.e., a dedicated route from that latch 135E to the sequential element 125 in the interface 115. The routing algorithm then identifies routes from the sequential element 125 to the corresponding CLB 110 which have routing delays that are less uncertain and have less variation than routes extending from the hardened block 150 into the CLBs 110.

The programmable pipeline 120 is programmable or configurable in that it includes two alternative paths for routing data from the hardened block 150 into the PL fabric 105. In addition to the sequential element 125, the programmable pipeline 120 includes a bypass path 130 so that a net can bypass the sequential element 125. For example, a user or design application may determine that the net is not time critical (e.g., easily satisfies the timing requirements). Thus, that net can use the bypass path 130 to avoid the sequential element 125. Bypassing the sequential element 125 can be advantageous because using the pipeline 120 causes latency when using the sequential element 125 for non-critical nets (which use a sequential element in the PL fabric instead). Moreover, bypassing the sequential element 125 means that this element 125 can instead be used for a time critical net (assuming the programmable pipeline can be used to either read data into, or read data out of, the hardened block). If a net is time critical, the configuration algorithm instead routes the net through the sequential element 125 rather than using a sequential element in the PL fabric.

As shown, the PL fabric 105 includes a plurality of CLBs 110 that each contains PL (not shown). The CLBs 110 can be programmed to perform any number of different functions such as machine learning tasks, wireless data processing, cryptography, compression, or other acceleration tasks. In this example, the latches 135A and 135B are illustrated in CLB 110B and 110D, respectively. These latches 135A and 135B represent beginnings of nets for transmitting data to the hardened block 150 (as is the case with the latch 135A)

and receiving data from the hardened block 150 (as is the case with the latch 135B). These nets are routed through the interface 115. Further, the latches 135 in FIG. 1 can be any sequential element such as a flip flop.

While the interface 115 is shown as part of the PL fabric 105, the programmable circuitry in the interface 115 may be different from the programmable circuitry in the CLBs 110. For example, the CLBs 110 may predominately include look up tables (LUTs), adders, flip-flops, latches etc., while the interface 115 includes the latch 135C, the programmable pipeline 120, and multiplexers for routing the data between the CLBs and the hardened block 150.

The hardened block 150 includes specialized circuitry. While different than the PL in the fabric 105, the circuitry in the hardened block 150 may be still be configurable. In one embodiment, the hardened block 150 includes software-configurable hardened logic. One advantage of including hardened logic is that the hardened block 150 may take up less space in the IC 100 relative to using programmable logic to form the hardware elements in the hardened block 150. That is, using hardened logic circuitry to form the hardware elements in the hardened block 150 such as instruction fetch/decode unit, fixed-point vector units, floating-point vector units, arithmetic logic units (ALUs), multiply accumulators (MAC), media access controllers, and the like can significantly reduce the footprint of the IC 100 relative to using PL to implement these hardware circuits. Although the hardened block 150 includes hardened logic that performs a predefined or fixed function (e.g., an unchangeable function), this does not mean the hardened block 150 is not programmable (or configurable). That is, the hardened block 150 can be configured when the IC 100 is powered on or rebooted to perform their predefined functions differently or using different parameters, or to perform some of their predefined functions, but not others.

While FIG. 1 illustrates a single chip, this interface pipelining can also be used in stacked architecture where hard blocks are accommodated primarily in a base die (a first die) while other PL blocks would be in other dice (a second die). That is, the embodiments herein can be used in a stacked die configuration such as an active-on-active (AoA) configuration where active die can be directly stacked on top of each other and can communicate with each other without an intervening passive device, or a 2.5D configuration where an active die is disposed on an interposer. In this embodiment, the data paths and clocks might have more variations either due to process variation or due to length of interface wire between die due to alignment. Thus, the techniques described herein can be used in a multi-die system.

Figure 2:
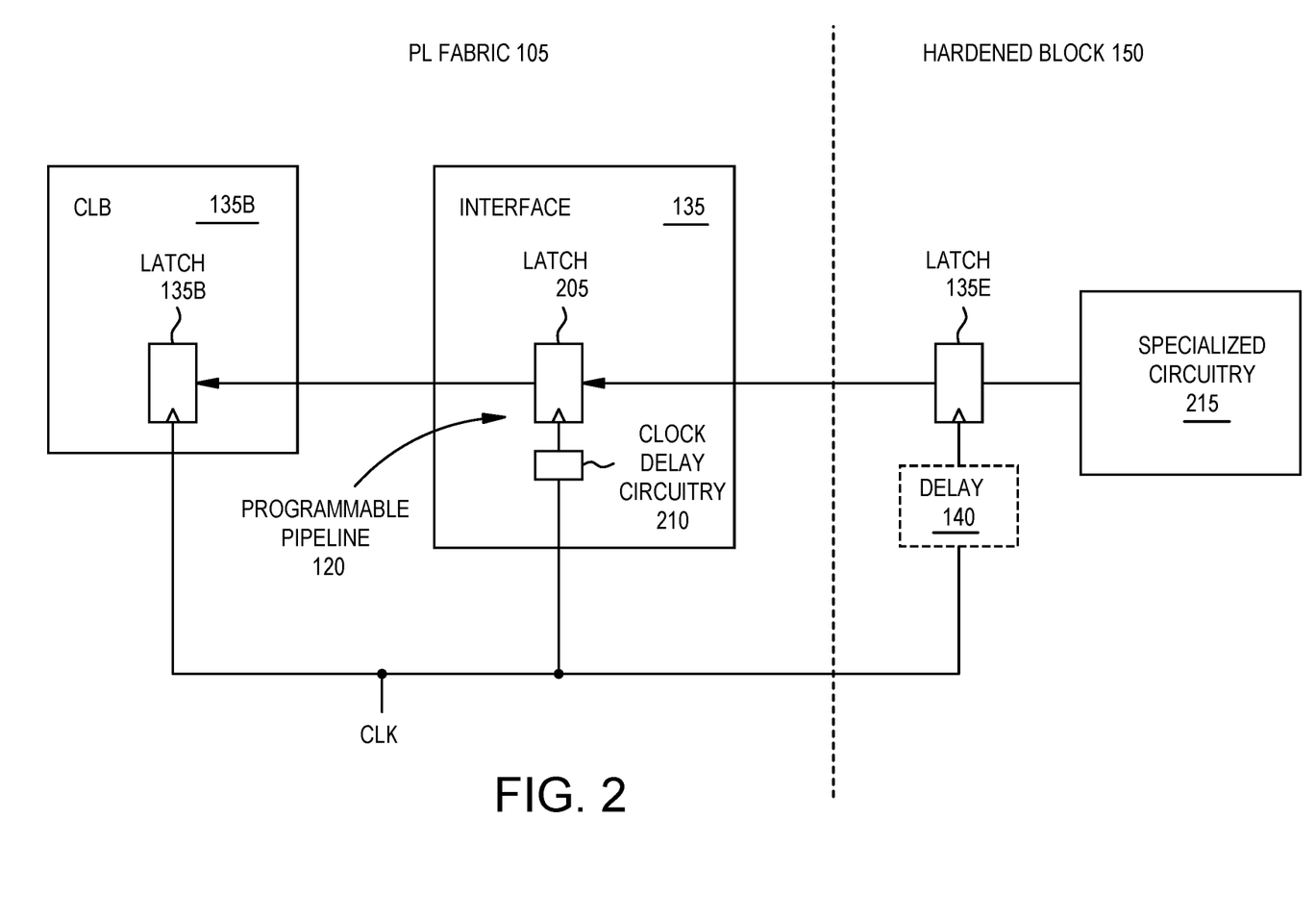
FIG. 2 is a block diagram of a programmable pipeline for transmitting data between a hardened block and a PL fabric, according to an example.

FIG. 2 is a block diagram of a programmable pipeline 120 for transmitting data between a hardened block and a PL fabric, according to an example. For simplicity, FIG. 2 illustrates fewer details than FIG. 1 in order to illustrate the circuitry in the programmable pipeline 120 with more detail.

The hardened block 150 includes specialized circuitry 215 for performing a dedicated function such as a math engine, media access controller, digital signal processing, and the like. The specialized circuitry 215 generates data that is transmitted to the latch 135E. Due to the clock skew caused by the delay 140 and possible routing difficulties, the latch 135E forwards the data to a latch 205 in the programmable pipeline 120 rather than directly to the latch 135B in the CLB 110B.

While a latch 205 is shown, the programmable pipeline 120 can include other types of sequential elements such as a flop. The programmable pipeline 120 also includes clock delay circuitry 210 that helps to provide programmable delays which may or may not be needed depending on the desired interface speed. Though the clock delay circuitry 210 can contain the clock delay capabilities, other control circuitry like a pulse generator, a clock inversion circuit, or other clock control circuit can perform this function instead. Moreover, as discussed above, the programmable pipeline 120 can include a bypass path which can be used for nets that are not time critical.

The latch 205 forwards the received data from the interface 115 to the latch 135B in the CLB 110B. In this manner, the latch 205 is an intermediary between the latch 135E in the hardened block 150 and the latch 135B in the CLB 110B. In one embodiment, transmitting the data from the latch 135E to the latch 205 in the interface 115 can mitigate the clock skew between the value of the clock in the hardened block 150 and the PL fabric 105. Moreover, in one embodiment, the route between the latch 135E and the latch 205 is fixed using dedicated routes. In one embodiment, the route between the latch 205 and the latch 135B in the CLB 110B is variable and is set using a routing algorithm.

Figure 3:
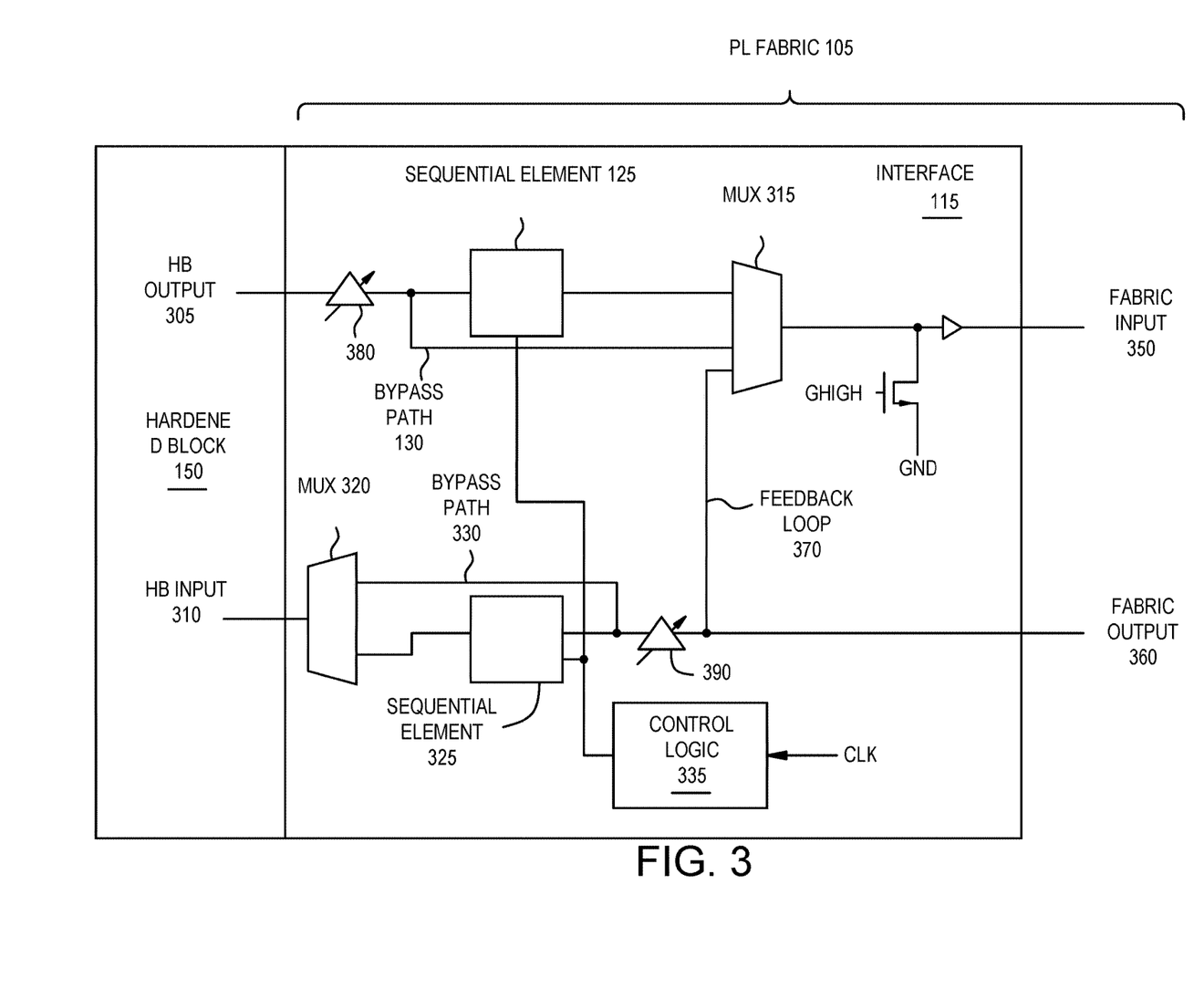
FIG. 3 illustrates circuitry for controlling the sequential element in a programmable pipeline, according to an example.

FIG. 3 illustrates circuitry for controlling the sequential element in a programmable pipeline. FIG. 3 illustrates a hardened block (HB) output 305 and HB input 310 and a fabric input 350 and fabric output 360. As shown, the sequential element 125 of the programmable pipeline is disposed between the HB output 305 and the fabric input 350.

As shown, data transmitted from the HB output 305 first passes through a programmable data-path delay 380 (which is optional) before reaching the sequential element 125 and the bypass path 130. Determining whether to use the output of the sequential element 125 or the bypass path 130 is determined by a select signal provided to a mux 315. That is, if the data transmitted between the HB output 305 and the fabric input 350 corresponds to a non-critical net, then the mux 315 is set so that its input connected to the bypass path 130 is used as its output. That is, the mux 315 forwards the data received from the bypass path 130 to the fabric input 350. However, to mitigate clock skew and routing variation, the programmer or design application may set the select signal of the mux 315 so that the mux 315 forwards the data received from the output of the sequential element 125.

The data path between the fabric output 360 and the HB input 310 has a similar circuit structure. Data transmitted by the fabric output 360 is received by a programmable data-path delay 390, which is optional. The data is also forwarded to the input of the mux 315 as part of a test feedback loop 370, but this loop 370 is optional.

The programmable data-path delay 390 forwards the data to a sequential element 325, which may be the same as the latch 135C illustrated in FIG. 1. However, this element 325 may be a flop instead. The data is also routed around the sequential element 325 using a bypass path 330. The select signal of a mux 320 determines whether the data receiving using the bypass path 330 or the sequential element 325 is then forwarded to the HB input 310 by the mux 320.

The interface 115 also includes control logic 335 that receives the CLK signal and generates clocking signals for the sequential elements 125 and 325. In one embodiment, the control logic 335 includes programmable clock delay circuitry such as the clock delay circuitry 210 in FIG. 2.

As shown in FIG. 3, the interface 115 includes dedicated sequential elements 125, 325 in the interface 115 for communicating with the hardened block 150. The system designer can then decide whether to use those elements 125, 325 or to bypass them using the bypass paths 130, 300 which may, e.g., save power.

Figure 4:
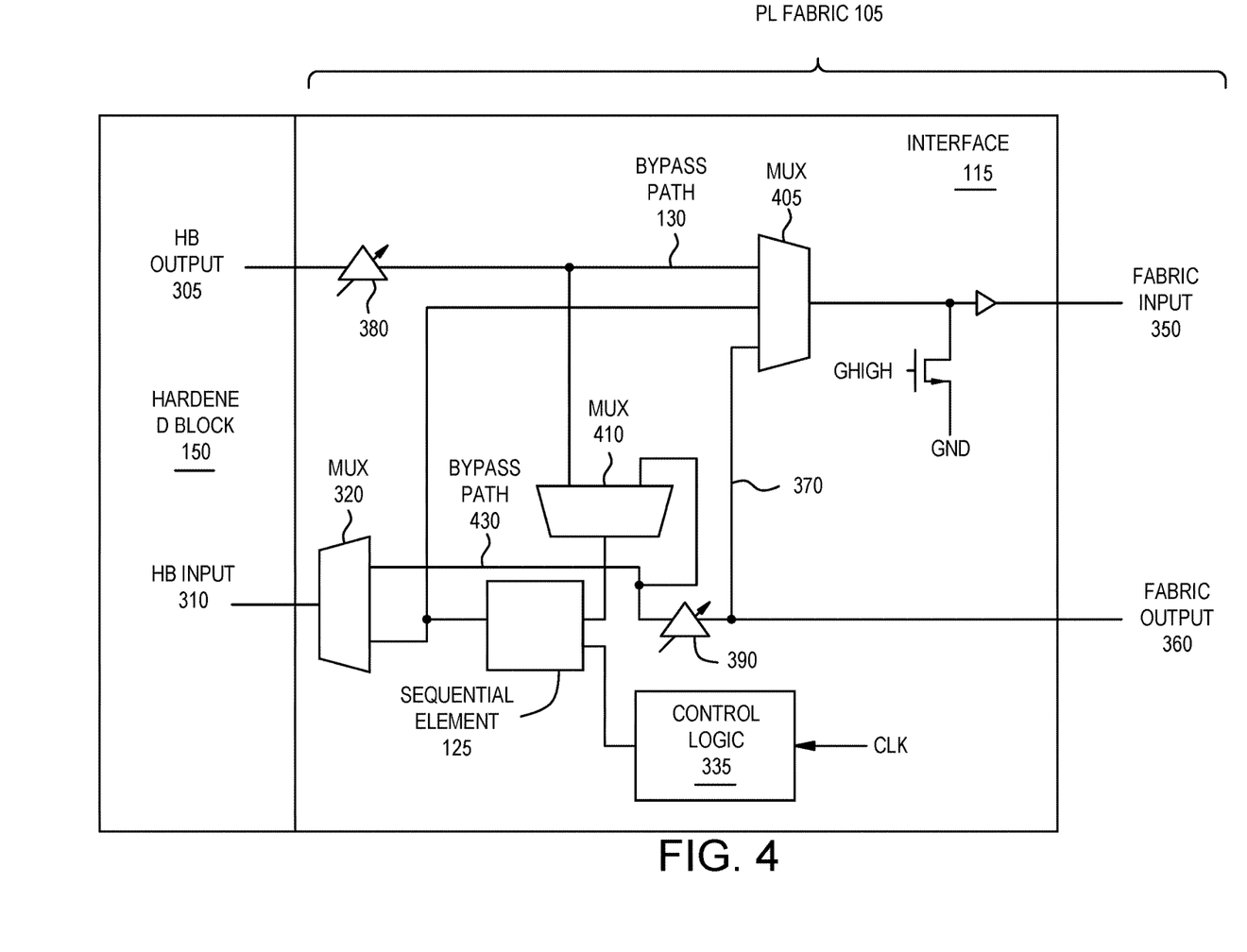
FIG. 4 illustrates a dual-purpose sequential element, according to an example.

FIG. 4 illustrates a dual-purpose sequential element, according to an example. Rather than including a separate sequential element for the two data paths between the hardened block 150 and the PL fabric 105, the interface 115 includes a dual-purpose sequential element 125 which can be used either when transmitting data from the HB output 305 to the fabric input 350 or when transmitting data from the fabric output 360 to the HB input 310.

When used to transmit data from the hardened block 150 to the PL fabric 105, the data transmitted from the HB output 305 passes through the programmable data-path delay 380 and to respective inputs of a mux 405 and a mux 410. If the sequential element 125 is being used, the mux 410 forwards the data to the sequential element 125 while the mux 405 ignores the received data (i.e.; the bypass path 130 is not used). The sequential element 125 then outputs the data to both the mux 320 and the mux 405. The mux 320 ignores the received data while the mux 405 forwards the data received from the sequential element 125 to the fabric input 350. Because the data transmitted by the HB output 305 uses the sequential element 125, the data transmitted by the fabric output 360 cannot. Thus: the data transmitted by the fabric output 360 passes through the programmable data-path delay 390 and is received at respective inputs of the mux 410 and mux 320. The mux 410 ignores the data while the mux 320 forwards the received data (thereby bypassing the sequential element 125 along a bypass path 430) directly to the HB input 310.

In contrast, it may be desired that the sequential element 125 be used when transmitting data from the fabric output 360 to the HB input 310, but not when transmitting data from the HB output 305 to the fabric input 350. In that case, the data transmitted by the fabric output 360 again passes through programmable data-path delay 390 and is received at respective inputs of the mux 410 and the mux 320. However, in this scenario, the mux 320 ignores the data while the mux 410 forwards the received data to the sequential element 125 where it is stored. The output of the sequential element 125 transmits the data to both the mux 320 and the mux 405. The mux 405 can ignore the data while the mux 320 forwards the data to the HB input 310. On the other hand, the data transmitted by the HB output 305 bypasses the sequential element 125 by using the bypass path 130. That is, after passing through the programmable data-path delay 380, the data is received at the mux 410 and the mux 405 where the mux 410 ignores the data but the mux 405 selects the data received using the bypass path 130 for its output. The data is then received at the fabric input 350.

In this manner, the muxes 405, 410, and 320 can be configured so that data transmitted in one direction is stored in the sequential element 125 while data transmitted in the other direction bypasses the sequential element 125. Further, at one point in time, the sequential element 125 stores data transmitted from the HB output 305 to the fabric input 350 but the programmable IC can be reconfigured at a second point in time such that the sequential element 125 stores data transmitted from the fabric output 260 to the HB input 310.

Figure 5:
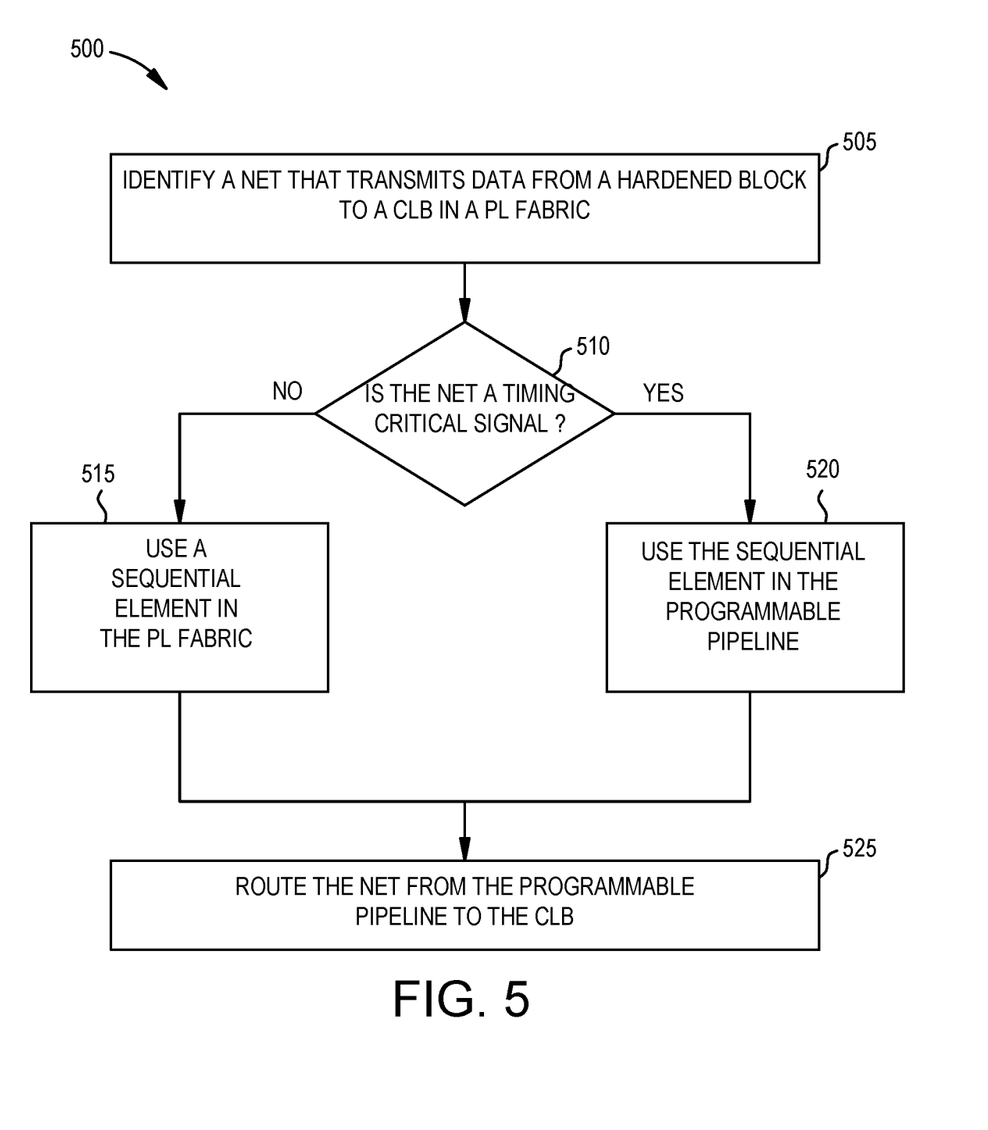
FIG. 5 is a flowchart for configuring a programmable pipeline at an interface between a hardened block and PL fabric, according to an example.

FIG. 5 is a flowchart of a method 500 for configuring a programmable pipeline at an interface between a hardened block and PL fabric, according to an example. At block 505, a software design application identifies a net in a netlist of a design of a programmable IC that transmits data from a hardened block to a CLB in a PL fabric. In one embodiment, the design application is a software suite executing on a general purpose processor. The design application may execute on a computer that is physically attached to the programmable IC, but this is not a requirement. The design application can execute in a database or in a cloud computing environment.

At block 510, the design application determines whether the net transmits a timing critical signal. The design application can use any number of techniques for estimating the timing of a net (e.g., a time parameter of the net) and determining whether the net can satisfy a timing requirement. For example, the design application may use the distance between the end points of the net, or congestion or demand for the same routing resources that are likely to be used by the net to predict whether the net will be able to satisfy its timing requirements. If the design application determines that the net is likely not going to satisfy its timing requirements (or is close to not satisfying its timing requirements), the design application labels the net as time critical.

If the net is not time critical, the method 500 proceeds to block 515 where the design application uses a sequential element in the PL fabric to meet timing requirements. As mentioned above, the location of the sequential element in the PL fabric can vary, which means the route timing can vary (e.g., the design application may not guarantee the routing length). However, this variability may be not cause any timing issues for nets that are not time critical.

For routes that use sequential elements in the PL fabric these routes may not pass through the programmable pipeline to get to the hardened block, or if they do, these routes may bypass the programmable pipeline using a bypass path. That is, rather than using the sequential element in the programmable pipeline, the design application instead configures the programmable IC such that a sequential element in the PL fabric and the bypass path are used (e.g., by controlling the select signals of the muxes illustrated in FIGS. 3 and 4).

If the net is time critical, the method 500 proceeds to block 520 where the design application uses the sequential element in the programmable pipeline to transfer the net between the hardened block and the CLB in the PL fabric. In one embodiment, the sequential element serves as an intermediate buffer between the CLB and the hardened block which mitigates the risk the net will not satisfy its timing requirements since the route between the sequential element in the programmable pipeline and the hardened block is a short, dedicated route. Also, in one embodiment, the route between the hardened block and the sequential element in the programmable pipeline is fixed or predetermined using dedicated routing resources. Thus, the design application does not need to use a routing algorithm to select routing resources for routing the net from the hardened block to the interface. As discussed above, this can remove much of the uncertainty with the routing process and better guarantee that timing requirements are satisfied relative to using a pipeline element in the PL fabric (e.g., a flop in the PL fabric where the routing distance to the hardened block is not guaranteed). For the nets that are determined to be not time critical at block 510, the design application can use the routing algorithm to identify the route resources to use between the hardened block and the CLBs in the PL fabric.

Further, regardless whether the design application uses a sequential element in the programmable pipeline (block 520) (if the net is time critical) or uses a sequential element in the PL logic (block 515) (if the net is not time critical), the netlist may be the same. That is, the netlist may define the same endpoints, but the design application can determine whether to use a sequential element in the programmable pipeline or in the PL fabric using timing estimates corresponding to the route.

At block 525, the design application routes the net from the programmable pipeline to the CLB. In one embodiment, the design application performs a placement function to place the different various functional block in the CLBs in the PL fabric. The design application can then use a routing technique to route the nets between the CLBs, and between the CLBs and components outside of the PL fabric, such as the hardened block. In one embodiment, block 525 is performed after blocks 505-520 and for each net in the netlist that crosses between hardened blocks into the PL fabric.

Further, while the method 500 illustrates transmitting data using a net that extends between the PL fabric to the hardened block, the embodiments above may also be used when transmitting data between two hardened blocks that pass through the PL fabric. That is, for timing critical nets, the design application may use the sequential element in the programmable pipeline. However, for nets that are not timing critical, the design application can select a pipeline element in the PL fabric (e.g., a flop not in the programmable pipeline).

Figure 6:
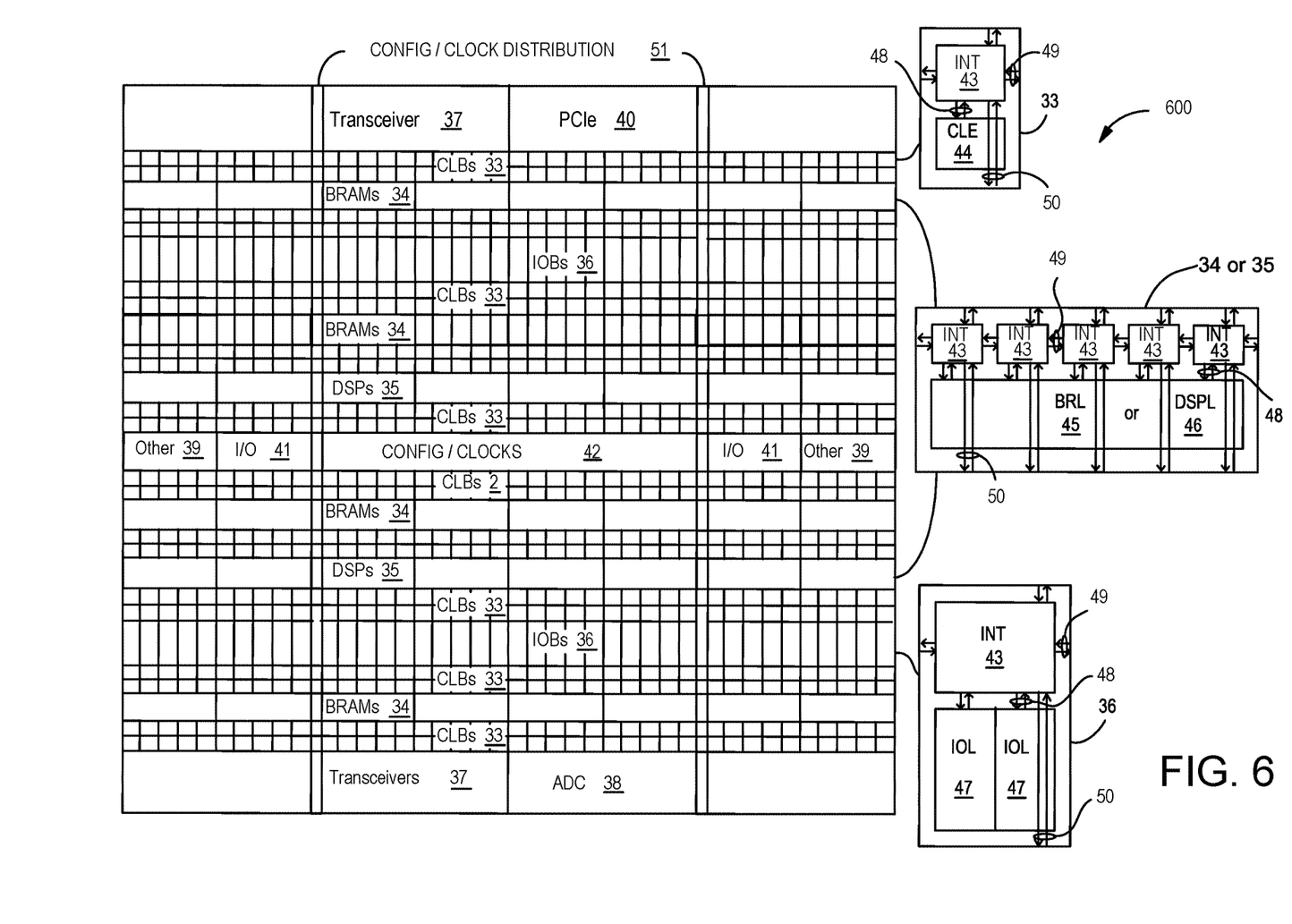
FIG. 6 illustrates a field programmable gate array implementation of a programmable IC according to an example.

FIG. 6 illustrates an FPGA implementation of an PL fabric that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 6. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. In one embodiment, the CLBs 33 can be communicatively coupled to hardened blocks (not shown) using the techniques described above in FIGS. 1-4. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP block 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 6) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A programmable integrated circuit (IC), comprising:
a hardened block comprising a first sequential element;
a programmable logic (PL) fabric comprising a second sequential element; and
an interface comprising a programmable pipeline that communicatively couples the first and second sequential elements,
wherein the programmable pipeline comprises a third sequential element and a bypass path that bypasses the third sequential element, wherein the programmable pipeline is programmed, based on a time criticality assigned to a net by a software design application, to use one of the third sequential element and the bypass path when transmitting data between the first and second sequential elements.

2. The programmable IC of claim 1, wherein the PL fabric comprises a plurality of configurable logic blocks (CLBs), wherein a first one of the CLBs comprises the second sequential element.

3. The programmable IC of claim 1, wherein the programmable pipeline comprises at least one multiplexer coupled to an output of the third sequential element and an output of the bypass path.

4. The programmable IC of claim 3, wherein the multiplexer is configured to select only one of the output of the third sequential element and the output of the bypass path to forward to the second sequential element.

5. The programmable IC of claim 1, wherein the programmable pipeline comprises a plurality of multiplexers arranged such that the third sequential element is switchably configurable to one of: (i) store data transmitted from the first sequential element to the second sequential element and (ii) store data transmitted from the second sequential element to the first sequential element.

6. The programmable IC of claim 1, wherein the first, second, and third sequential elements are controlled by a same clock.

7. The programmable IC of claim 6, wherein a value of the clock in the hardened block is skewed relative to a value of the clock in the PL fabric due to a delay between the hardened block and a common point of coupling in the PL fabric.

8. The programmable IC of claim 1, further comprising:
a dedicated route between the first sequential element in the hardened block and the third sequential element in the programmable pipeline.

9. The programmable IC of claim 1, wherein the hardened block comprises hardened logic that performs a fixed function.

10. A method, comprising:
determining that a first net in a netlist is time critical, wherein the first net extends from a first sequential element in a hardened block to a second sequential element in a PL fabric;
configuring a first programmable pipeline in the PL fabric such that the first sequential element transmits data to a third sequential element in the first programmable pipeline before the data reaches the second sequential element;
determining that a second net in the netlist is not time critical, wherein the second net extends from a fourth sequential element in the hardened block to a fifth sequential element in the PL fabric; and
selecting a sixth sequential element in the PL fabric to route the second net between the fourth and fifth sequential elements.

11. The method of claim 10, wherein configuring the first programmable pipeline and configuring a second programmable pipeline comprises providing select signals to control respective multiplexers in the first and second programmable pipelines.

12. The method of claim 10, further comprising:
performing a routing algorithm to identify a route for the first net that extends from the third sequential element in the first programmable pipeline to the second sequential element in the PL fabric, wherein a route for the first net that extends from the first sequential element in the hardened block to the second sequential element is fixed and does not need to be routed.

13. The method of claim 12, further comprising:
performing the routing algorithm to identify a route for the second net that extends from the fourth sequential element in the hardened block to the fifth sequential element in the PL fabric.

14. The method of claim 10, wherein the PL fabric comprises a plurality of CLBs, wherein a first one of the CLBs comprises the second sequential element and a second one of the CLBs comprises the fifth sequential element.

15. The method of claim 10, wherein the first programmable pipeline and a second programmable pipeline are disposed in an interface in the PL fabric.

16. The method of claim 10, wherein the first programmable pipeline and a second programmable pipeline comprise at least one multiplexer coupled to select between using respective bypass paths or using respective sequential elements to facilitate communication between the hardened block and the PL fabric.

17. The method of claim 10, wherein configuring the first programmable pipeline to use the third sequential element mitigates a clock skew between the hardened block and the PL fabric relative to using a bypass path in the first programmable pipeline that bypasses the third sequential element.

18. The method of claim 10, wherein configuring the first programmable pipeline to use the third sequential element reduces routing uncertainty when selecting a route for the first net between the hardened block and the PL fabric relative to using a bypass path in the first programmable pipeline that bypasses the third sequential element.

19. A method, comprising:
identifying a first net in a netlist that extends from a first sequential element in a hardened block to a second sequential element in a PL fabric;
selecting, based on a time parameter of the first net, one of (i) using a third sequential element in a programmable pipeline and (ii) using a fourth sequential element in the PL fabric and a bypass path in the programmable pipeline when transmitting data between the first and second sequential elements; and
configuring the programmable pipeline in response to the selecting.

20. The method of claim 19, further comprising, after selecting to use the third sequential element:
performing a routing algorithm to identify a route between the third sequential element and the first sequential element, wherein the route between the third sequential element and the second sequential element is fixed and does not need the routing algorithm.

* * * * *